Dec. 7, 1954 J. W. DROLL 2,696,164

TRUCK FOR HANDLING SPRING ASSEMBLIES

Filed June 28, 1948 3 Sheets-Sheet 1

Inventor
Joseph W. Droll
By: Fred Gerlach his Atty.

Dec. 7, 1954 J. W. DROLL 2,696,164
TRUCK FOR HANDLING SPRING ASSEMBLIES
Filed June 28, 1948 3 Sheets-Sheet 2
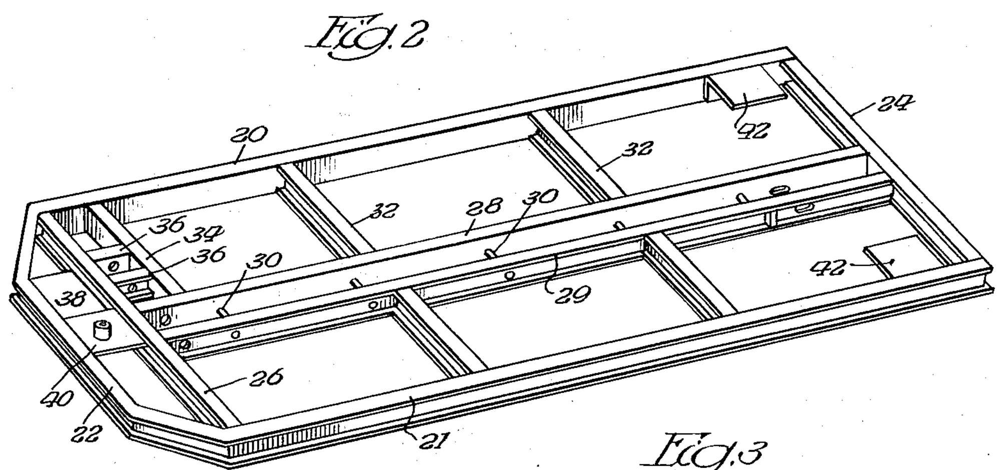
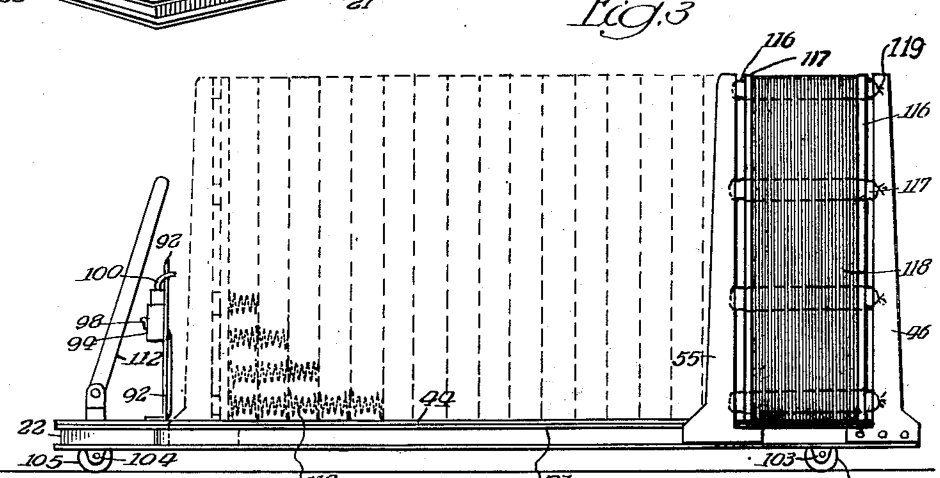
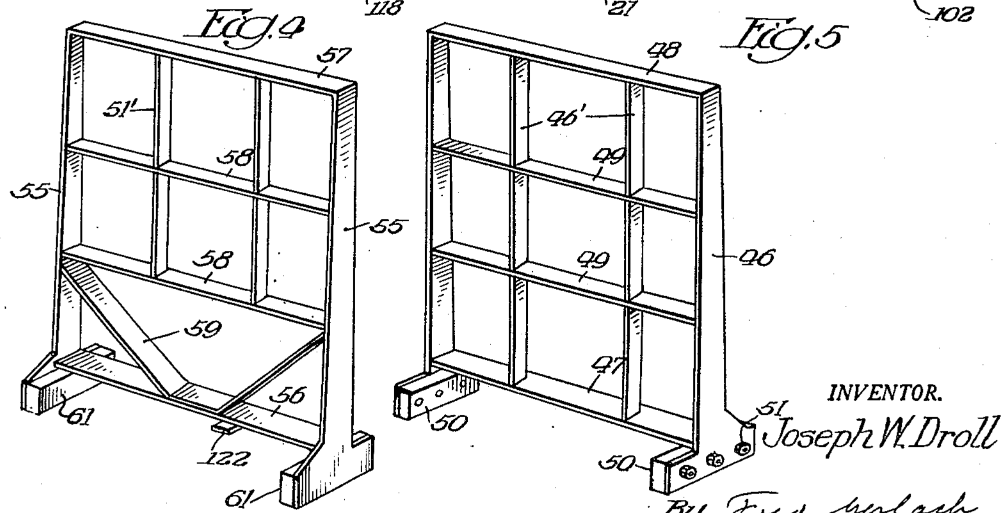
INVENTOR.
Joseph W. Droll
By Fred Gerlach
his atty.

Dec. 7, 1954 J. W. DROLL 2,696,164
TRUCK FOR HANDLING SPRING ASSEMBLIES
Filed June 28, 1948 3 Sheets-Sheet 3
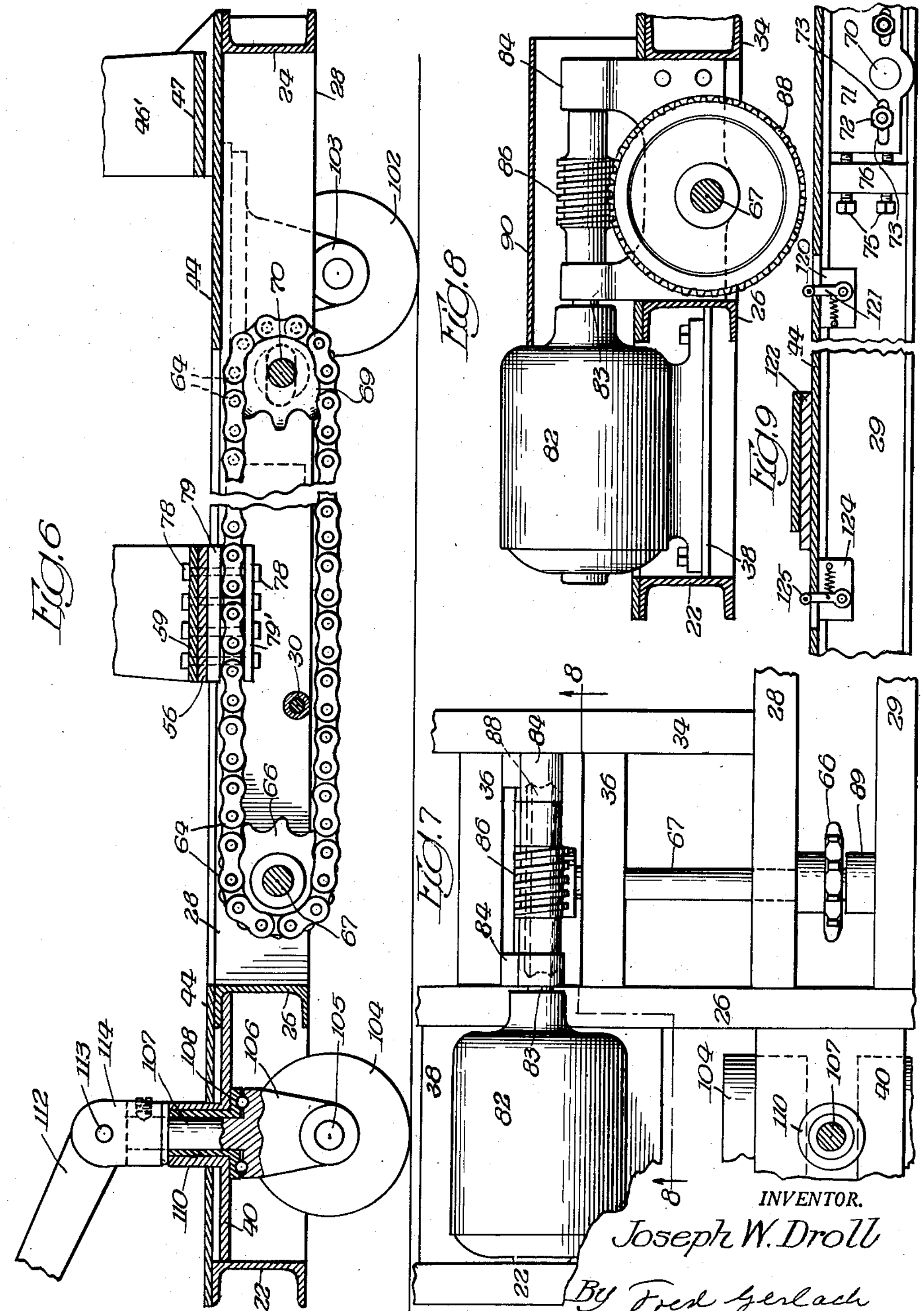

United States Patent Office 2,696,164

Patented Dec. 7, 1954

2,696,164

TRUCK FOR HANDLING SPRING ASSEMBLIES

Joseph W. Droll, Chicago, Ill., assignor, by mesne assignments, to United Mattress Machinery Company, Quincy, Mass., a corporation of Maine Application June 28, 1948, Serial No. 35,661

6 Claims. (Cl. 100—100)

The invention relates to trucks for handling spring assemblies.

Assemblies of springs for use in beds, cushions, or the like are usually produced at a spring-factory and shipped to concerns who cover or finish them. In order to avoid the high shipping charges due to the bulkiness of the spring-assemblies, a group, for example, twenty, of these assemblies are compressed into a compact bale, which usually consists of a pair of wood frames between which the assemblies are held compressed as closely together as possible by suitable ties, such as loops of wire. These groups of springs, when the bale is broken, present difficulties in handling them while they are expanded for individual handling.

One object of the invention is to provide a portable truck with a low-level platform for a bale of spring-assemblies by which their separation and handling after the bale is broken, will be expedited.

Another object of the invention is to provide a truck which simplifies the handling of the bale and the spring-assemblies after the bale is broken.

Another object of the invention is to provide a truck for this purpose, which is simple in construction and efficient in operation.

Other objects will appear from the detailed description.

The invention consists in the several novel features which are hereinafter described and more particularly defined by the claims at the conclusion hereof.

In the drawings—

Fig. 1 is a perspective of a portable truck embodying the invention;

Fig. 1–A is a diagrammatic view of the electric circuits and control devices;

Fig. 2 is a perspective of the base frame which underlies the bale supporting platform;

Fig. 3 is a side elevation illustrating a bale of springs supported on the truck, the slidable follower being illustrated by dotted lines in position for releasing the assemblies;

Fig. 4 is a perspective of the slidable upstanding follower;

Fig. 5 is a perspective of the upstanding frame which is fixedly mounted on the truck;

Fig. 6 is a central longitudinal section taken on the line 6—6 of Fig. 1 of the truck, the central portion being broken away;

Fig. 7 is a plan of the motor and gearing for driving the chain for shifting the slidable follower;

Fig. 8 is a section taken on the line 8—8 of Fig. 7; and

Fig. 9 is a vertical longitudinal section taken on the line 9—9 of Fig. 1 through the platform illustrating the switches for automatically limiting the fore-and-aft movements of the follower.

Figure 1A:
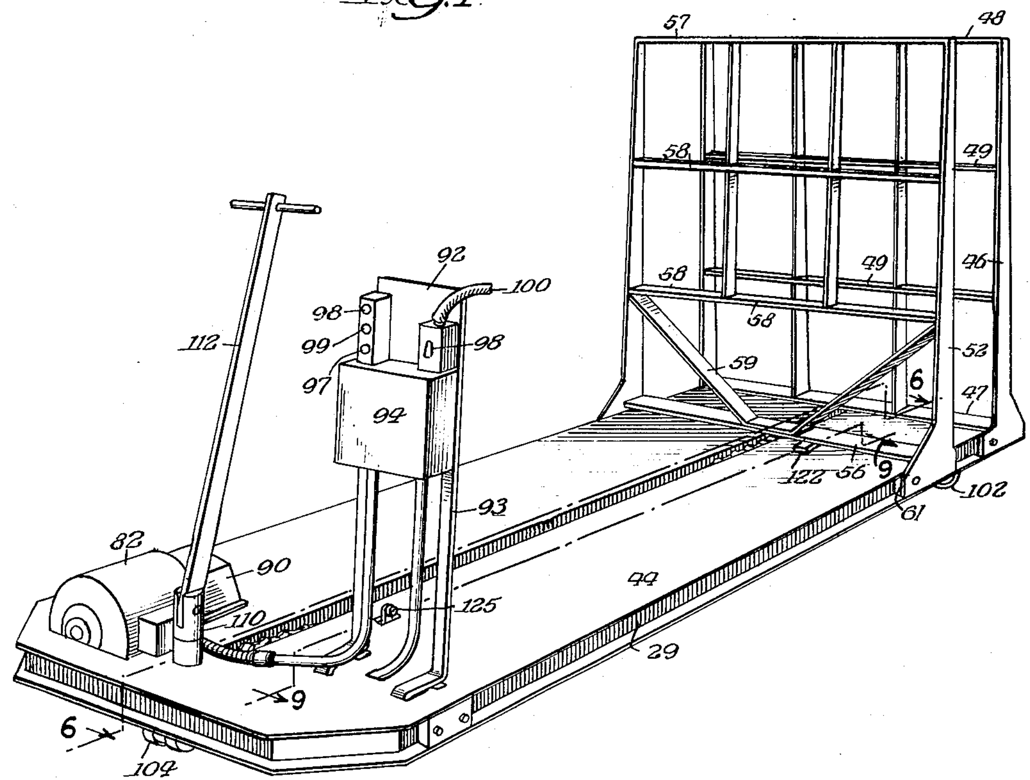

The invention is exemplified in the structure which comprises generally a platform or floor adapted to support a bale of spring-assemblies and, when the assemblies have been released from the bale and are expanded, a base-frame underlying the platform or floor and provided with carrying wheels for transporting the load; an upstanding cross-frame fixedly secured on the rear end of the frame and a co-acting upstanding cross-frame mounted to slide longitudinally of the frame and to and from rigid cross-frame, which functions as a follower for engaging the bale containing the group of packed spring assemblies, and is shiftable forwardly over the platform to control the expansion of the spring-assemblies after the bale is broken; an endless chain and sprockets underlying the platform for shifting the slidable follower; speed-reducing gearing for driving the chain for shifting the follower in opposite directions; and is adapted to be driven by a reversible electric motor mounted on the truck for driving said gearing; and control mechanism for selectively operating the motor to drive the gearing for shifting the follower to and from the fixed cross-frame; and a drawbar for manually moving the truck and its load from place to place in distributing the expanded spring-assemblies.

The base or truck-frame comprises a channel bar bent to form side rails 20 and 21 and a front rail 22, and a rear channel bar 24; a cross-bar 26 extending between side rails 20, 21 adjacent the front of the frame; a pair of longitudinal channel bars 28 and 29 which extend between the rear sill 24 and cross-bar 26 and are spaced apart transversely of the frame to provide a space for the operation of the endless chain and sprockets for shifting the slidable follower; spacing sleeves and bolts 30 between the inner faces of bars 28; channel cross-bars 32 between the side rails and the longitudinal bars 28 and 29; a bar 34 between side rail 20 and longitudinal bar 28; a pair of channel bars 36 extending between bar 34 and cross-bar 26 for supporting the gearing for driving the endless chain; a plate 38 between front rail 22 and cross-bar 26 on which the electric motor is supported; a plate 40 between front rail 22 and cross-bar 26, in which the spindle for the front caster-wheels are journaled; and plates 42 adjacent the rear end of the frame to which the brackets for the rear carrying wheels are secured. The top surfaces of these parts of the base-frame are substantially co-planar and rigidly support a platform or floor 44 which is formed of rigid plate-metal for adapting it to support the loads to be carried. The platform and the structural parts of the base-frame are all rigidly secured together mainly by welding. The platform 44 is provided with a slot over the space between the longitudinal bars 28 and 29.

The rigid upstanding cross-frame at the rear end of the platform or floor comprises standards 46 which are rigidly cross-connected by a lower bar 47, an upper bar 48, inner vertical base 46′, intermediate horizontal bars 49, and blocks 50 which are fixedly secured to the lower ends of standards 46 and fit in the channels in the outer faces of the side rails 20, 21, respectively. The lower ends of standards 46 and the blocks 50 are elongated longitudinally of the truck frame to resist heavy thrust stresses, and are fixedly secured by bolts 51 to the side rails 20, 21. These standards and cross-bars of the fixed upstanding cross-frame are formed of flat bars or plates and rigidly secured together by welding.

The slidable upstanding cross-frame or follower comprises a pair of standards 55, a lower cross-bar 56, a top cross-bar 57, intermediate cross-bars 58, vertical bars 55′, and a brace-bar 59, all of which are formed of flat bars or plates and rigidly secured together by welding. The lower ends of standards 55 are extended longitudinally of the truck frame, and elongated shoes 61 are fixed to the inner faces of said standards, and are slidably fitted in the channels in the outer sides of said rails 21 and 22. The elongated shoes 61 and extended lower ends of standards 55 adapt the slidable cross-frame for heavy thrust stresses.

The slidable cross-frame or follower is shiftable to and from the fixed cross-frame by an endless chain 64, which travels in the space between the longitudinal bars 28 and 29. The front end of chain 64 extends around a sprocket wheel 66 on a drive shaft 67. The rear end of chain 64 extends around an idler sprocket 69 which is supported adjacent the rear end of the platform on a shaft 70 which is journalled in brackets 71. Bearing brackets 71 are adjustably supported from longitudinal bars 28, 29 by bolts 72 which extend through the vertical webs of bars 28 and 29 and slots 73 in said bearings and screws 75 are adapted to shift bearings 77 for taking up any slack in the chain 64.

The slidable follower is connected to travel with the upper reach of chain 64 by bolts 78 which extend through plates 79, 79′ which engage chain 60 and cross-bar 56 and brace 59 of the follower. Bolts 78 extend through the spaces between the links of the chain 64. This connection between chain 64 and the follower is movable in the space between the longitudinal bars 28, 29 and the slot in the platform 44 above said space.

The power operable mechanism for driving sprocket wheel 66 and chain 64 in opposite directions, comprises a reversible electric motor 82 which is mounted upon the plate 38 and includes a shaft 83 which extends into a bearing bracket 84; a worm 86 on shaft 83; and a worm gear 88 meshing with worm 86 and fixed to shaft 67. The outer end of shaft 67 is journalled in bearings in bracket 84 which is secured to one of the channel bars 36. The inner end of the shaft 68 is journalled in a bearing 89 on the longitudinal bar 29. A shield 90 is placed over the worm gear 86 and secured to the top of platform 44. This gearing reduces the speed of the shaft 67 and chain 64.

The platform 44 is supported at as low a level as possible to facilitate placement of the bales of the assemblies thereon and the removal of the expanded spring-assemblies therefrom. The truck is portable so that the load can be conveniently transported from place to place for distribution after the assemblies have been separated. For this purpose rollers 102 are supported in brackets 103 which are fixed to the angle plates 42 adjacent the rear of the frame underlying the platform. The front of the platform is supported by a pair of caster-wheels 104 which are mounted on a shaft 105 which is journalled in a bracket 106. The bracket 106 is provided with an upstanding stem 107 and carries a ball-bearing 108 on which the plate 40 is supported. Plate 40 is provided with an upstanding sleeve 110 in which stem 107 is journalled. A drawbar 112 is pivoted at 113 to a collar 114 which is fixed to the upper end of stem 107. These casters render the truck dirigible so that it can be conveniently transported from place to place on the factory floor.

The electrical control devices for the motor 82, for controlling the movement of the follower, are mounted adjacent the front of the platform on a panel 92 which is supported on a pair of standards 93. Said means includes a starter box 94, a switch button 98 for controlling the circuit for operating the motor in one direction, a switch button 99 for controlling a circuit for operating the motor in the reverse direction, and a stop-and-start switch button 97. These switches are connected to circuits for controlling the operation of motor 82 for shifting the follower to and from the fixed upstanding cross-frame. Current is supplied to the control mechanism by a flexible conductor cord 100 which is detachably connected to a switch 101 on the panel 92.

Figure 1A:
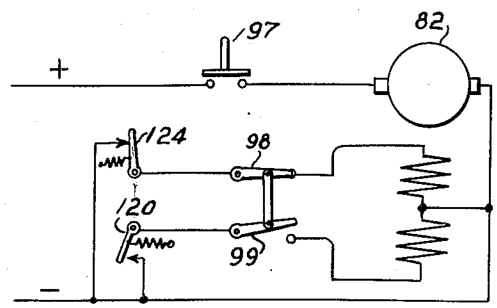

The rearward movement of the slidable frame or follower is automatically limited by a switch 120 which is electrically connected to the circuits diagrammatically illustrated in Fig. 1–A for controlling the motor 82 while it is operated to drive the upper reach of chain 64 rearward, and includes a spring-pressed controller arm 121. The upper end of arm 121 projects above the platform 44 and is engaged by the rear edge of a plate 122 on the follower. A switch 124 is included in the circuit for operating motor 82 when it drives the upper reach of chain 64 forward, and includes a spring-pressed arm 125 which is engaged by the front edge of plate 122 when the slidable upstanding frame engages arm 125 and interrupts the circuit to automatically limit the forward movement of said frame. These limit switches are mounted on the underside of platform 44 and arms 121 and 125 extend through slots in the platform.

The trunk is adapted to handle a group of spring-assemblies 118, for example, twenty, which are compressed together into a bale for shipment. The bale usually comprises a pair of frames, each of which includes bars 116 extending longitudinally of the spring-assemblies and cross-bars 117 extending transversely of the spring-assemblies, between which the springs are held compressed by loops of wire 119. In practice, a series, for example, twenty assemblies of springs which, when expanded, are each five inches in thickness, are usually compressed together to about fourteen inches. The upstanding fixed frame and the slidable frame or follower correspond in height substantially to the width of the spring-assembly. The spring-assemblies for bed-springs are usually about six feet in length and approximately four feet in width. The platform may be about four feet in width, and the assemblies will be supported on their longitudinal sides with end-portions thereof projecting laterally from the platform. When thus supported, these assemblies can be easily handled.

The operation will be as follows: A bale of spring-assemblies is placed crosswise on the platform 44 and between the fixed and slidable upstanding frames while the follower is forwardly of its rearmost position. The switch controls are then set to cause the motor 82 to shift the follower rearwardly until it engages the bale and exerts pressure thereon. The baling wires are then severed, whereupon the frames of the bale will be subjected to the expansive pressure of the group of spring-assemblies. When the plate 122 of the follower shifts switch arm 125 of limit switch 124, the electric motor will stop and the follower will be positioned, so that the spring-assemblies will individually be free for removal from platform 44. The truck may then be transported from place to place for unloading the assemblies where work is to be performed thereon. After the assemblies have been unloaded, the follower is again operated rearwardly for receiving a bale. During the rearward operation of the follower, plate 122 will engage arm 121 of rear limit switch 120 to arrest the follower when it is positioned to engage the front frame on the bale.

The invention exemplifies a portable low-level truck including a platform and upstanding frames for receiving a bale of spring-assemblies, and for controlling the expansion of the assemblies after the bale has been severed and into position for their individual handling on removal and transportation from place to place. The truck is simple and rugged in construction and expedites the manipulation or handling of the spring-assemblies.

The invention is not to be understood as restricted to the details set forth since these may be modified within the scope of the appended claims without departing from the spirit and scope of the invention.

Having thus described my invention, what I claim as new and desire to secure by Letters Patent is:

1. A portable truck for handling a bale of spring-assemblies, comprising: a portable low-level supporting structure adapted to receive a bale of compressed spring-assemblies and to support the assemblies when they are released from the bale and expanded including a platform and an underlying baseframe, having channelled side rails along the sides of the platform, an upstanding cross-frame stationarily mounted on the base-frame adjacent one end of the platform, a co-acting upstanding cross-frame provided with shoes slidably mounted in the channels in the side rails of the base-frame, for movement into position for receiving the bale and into position adjacent the front end of the platform for the expansion of the released assemblies, and mechanism for shifting the slidable cross-frame between said positions, including an endless chain extending longitudinally and adjacent the transverse center of the platform, and gearing adjacent the front end of the platform.

2. A portable truck for handling a bale of spring-assemblies, comprising: a low-level supporting structure adapted to receive a bale of compressed spring-assemblies and to support the assemblies when they are released from the bale and expanded, including a platform and an underlying base-frame, an upstanding cross-frame stationarily mounted on the base-frame adjacent one end of the platform, a co-acting upstanding cross-frame slidably mounted on the base-frame for movement into position for receiving the bale and into position adjacent the front end of the platform for the expansion of the released assemblies, mechanism for shifting the slidable cross-frame between said positions including an endless chain and a reversible electric motor, means for manually controlling the operation of the motor, and switches mounted under and provided with means extending through the platform said slidable cross-frame having a portion engageable with the switch means for automatically limiting the movement of the slidable cross-frame.

3. A portable truck for handling a bale of spring-assemblies, comprising, a low-level supporting structure adapted to receive a bale of compressed spring-assemblies and to support the assemblies when they are released from the bale and expanded, including a substantially flat platform, a rigid base-frame underlying the platform, including side, front, and rear rails, a cross-bar between the side rails adjacent the front end of the structure, a pair of central longitudinal bars spaced apart and extending between said cross-bar and the rear rail, an upstanding cross-frame secured on the base-frame adjacent the rear end of the frame, the side rails having channels in the outer sides; a co-acting upstanding cross-frame provided with shoes slidably mounted in said channels in the side rails, for movement into position to receive the bale and into position adjacent the front end of the platform for expansion of the released assemblies; means mounted to travel in the space between the longitudinal bars for shifting said slidable cross-frame; and mechanism mounted on the base-frame for driving said shifting means.

4. A portable truck for handling a bale of spring-assemblies, comprising: a substantially low-level supporting structure adapted to receive a bale of compressed spring-assemblies and to support the assemblies when they are released from the bale and expanded, including a substantially flat platform, a rigid base-frame including the platform, side, front, and rear rails, a cross-bar between the side rails adjacent the front end of the structure, a pair of central longitudinal bars spaced apart and extending between said cross-bar and the rear rail; an upstanding cross-frame rigidly secured on the base-frame adjacent the rear end of the frame; a co-acting upstanding cross-frame slidably mounted on said side rails for movement into position to receive the bale and into position adjacent the front end of the platform for expansion of the released assemblies; an endless chain mounted to travel in the space between the longitudinal bars operatively connected to the slidable frame, front and rear sprockets for the chain, and a reversible electric motor mounted on the base-frame and connected to drive the slidable frame through said chain.

5. A portable truck for handling a bale of spring-assemblies, comprising: a substantially low-level supporting structure adapted to receive a bale of compressed spring-assemblies and to support the assemblies when they are released from the bale and expanded, including a substantially flat platform, a rigid base-frame underlying the platform, including side, front, and rear rails, a cross-rail and a cross-bar between the side rails adjacent the front end of the structure, a pair of central longitudinal bars spaced apart and extending between said cross-bar and the rear rail; an upstanding cross-frame secured on the base-frame adjacent the rear end of the frame, a co-acting upstanding cross-frame slidably mounted on said side rails, for movement into position to receive the bale and into position adjacent the front end of the platform for expansion of the released assemblies, an endless chain mounted to travel in the space between the longitudinal bars and operatively connected to the slidable frame, front and rear sprockets for the chain, and gearing for operating the front sprocket and shifting the slidable cross-frame.

6. A portable truck for handling a bale of spring assemblies, comprising: a supporting structure adapted to receive a bale of compressed spring assemblies and to support the assemblies when they are released from the bale and expanded, including a horizontal platform and an underlying base frame, means disposed under the platform for movably supporting the structure, the base frame including longitudinal rails along the sides of the platform and provided with outwardly facing channels, an upstanding cross-frame stationarily mounted on the base-frame adjacent one end of the platform, a coacting upstanding cross-frame including members extending below the platform slidable in the channels in the rails for movement into position for receiving the bale and into position adjacent the front end of the platform for expansion of the released assemblies, the entire area over the platform between the cross-frames being clear for supporting the spring assemblies on the platform with their ends overhanging the structure, and gearing mounted on the structure below the platform and connected to the slidable cross-frame for shifting the slidable cross-frame between said positions.

References Cited in the file of this patent

UNITED STATES PATENTS

| Number | Name | Date |
|---|---|---|
| 508,191 | Thomas | Nov. 7, 1893 |
| 1,105,759 | Cummins | Aug. 4, 1914 |
| 1,232,711 | Mueller | July 10, 1917 |
| 1,769,452 | Murray | July 1, 1930 |
| 1,832,960 | Barrows et al. | Nov. 24, 1931 |
| 1,887,226 | Wunderlich | Nov. 8, 1932 |
| 2,353,221 | Clifton et al. | July 11, 1944 |
| 2,424,385 | Cook | July 22, 1947 |
| 2,435,440 | Graham | Feb. 3, 1948 |
| 2,476,574 | Aluotto | July 19, 1949 |